United States Patent
Dalton

(10) Patent No.: US 8,254,792 B2
(45) Date of Patent: *Aug. 28, 2012

(54) BURST MODE OPTICAL RECEIVER

(75) Inventor: Rodger Dalton, Wake Forest, NC (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/838,717

(22) Filed: Jul. 19, 2010

(65) Prior Publication Data

US 2010/0278542 A1 Nov. 4, 2010

Related U.S. Application Data

(63) Continuation of application No. 11/562,833, filed on Nov. 22, 2006, now Pat. No. 7,865,088, which is a continuation-in-part of application No. 11/383,110, filed on May 12, 2006, now Pat. No. 7,764,886.

(60) Provisional application No. 60/740,099, filed on Nov. 28, 2005.

(51) Int. Cl.
H04B 10/06 (2006.01)

(52) U.S. Cl. .......................... 398/210; 398/168; 398/207

(58) Field of Classification Search .................. 398/168, 398/202–214
See application file for complete search history.

(56) References Cited

U.S. PATENT DOCUMENTS

| | | | |
|---|---|---|---|
| 3,641,274 A | 2/1972 | Sasaki et al. | |
| 4,731,880 A | 3/1988 | Ault et al. | |
| 5,208,693 A | 5/1993 | Arstein et al. | |
| 6,362,911 B1 | 3/2002 | Lee et al. | |
| 7,865,088 B2 * | 1/2011 | Dalton | 398/210 |
| 2003/0067662 A1 * | 4/2003 | Brewer et al. | 359/189 |
| 2007/0023615 A1 | 2/2007 | Ruegg et al. | |
| 2007/0146080 A1 * | 6/2007 | Ivry | 330/308 |

FOREIGN PATENT DOCUMENTS

| | | |
|---|---|---|
| EP | 0451289 A1 | 10/1991 |
| EP | 0720319 A2 | 7/1996 |
| EP | 0909046 A2 | 4/1999 |
| EP | 1172955 A2 | 1/2002 |
| GB | 2171577 A | 8/1986 |
| JP | 04035330 | 6/1992 |
| JP | 2005039309 | 10/2005 |

OTHER PUBLICATIONS

Uhlhorn, R.W.; Proceedings of the IEEE National Aerospace and Electronics Conference 1998 (NAECON 1998); Jul. 13-17, 1998; pp. 160-167.

* cited by examiner

Primary Examiner — Dzung Tran
(74) Attorney, Agent, or Firm — RG & Associates

(57) ABSTRACT

A system and computer readable medium for a burst mode optical receiver that enables an optical receiver to receive signals from a plurality of optical network units at different optical power levels. In an exemplary embodiment, the system may include a memory that stores a received signal strength indication, and a media access controller communicably coupled to the memory. The media access controller receives a received signal strength indication of an upcoming data stream to an optical network unit, and asserts a signal control voltage during a guard time to an optical receiver to optimize reception of incoming data streams of the optical network unit based upon the received signal strength indication received from the upcoming data stream.

20 Claims, 10 Drawing Sheets

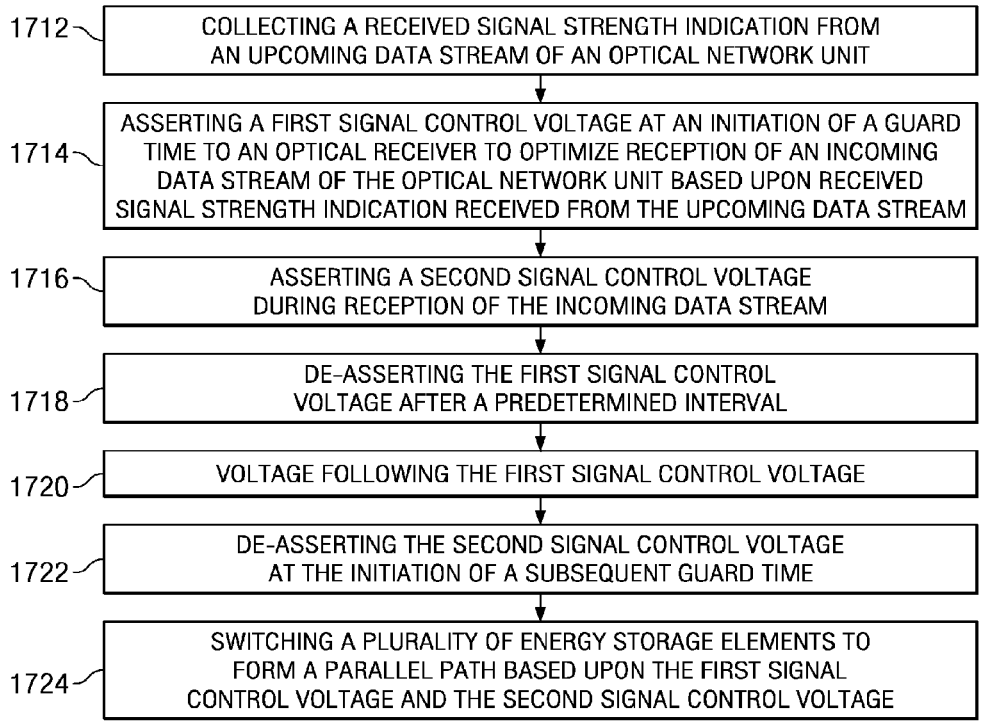
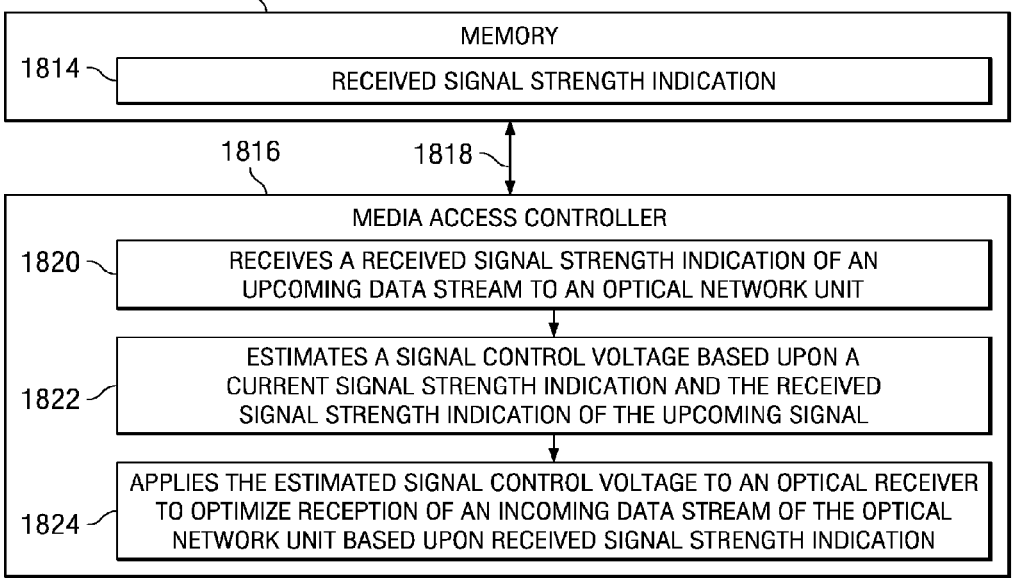

BURST MODE OPTICAL RECEIVER

CROSS REFERENCE TO RELATED APPLICATIONS

The present patent application is a Continuation and claims the benefit of U.S. application Ser. No. 11/562,833 filed on Nov. 22, 2006, entitled BURST MODE OPTICAL RECEIVER, which is a Continuation-In-Part and claims the benefit of U.S. application Ser. No. 11/383,110, filed on May 12, 2006, entitled BURST MODE OPTICAL RECEIVER, which is a Non-Provisional and claims the benefit of U.S. provisional application Ser. No. 60/740,099, filed on Nov. 28, 2005, entitled BURST MODE OPTICAL RECEIVER, the entire contents these applications incorporated by reference herein.

BACKGROUND OF THE INVENTION

A Passive Optical Network (PON) consists of an Optical Line Terminator (OLT), which resides in a Central Office (CO). The optical line terminator services a number of Optical Network Units (ONUs) typically connected in a star arrangement using optical splitters, which reside at a premise of a user. The upstream data on the passive optical network going from the optical network units to the optical line terminator is time-multiplexed between the multiple optical network units. Since each optical network unit may be located at a different distance from the optical line terminator, the amplitude of the upstream signal, seen at the optical line terminator, varies between optical network units. A problem occurs when two optical network units send consecutive bursts of data that are at very different power levels.

Current burst-mode optical receiver technology cannot predict the power level of a forthcoming burst of data seen at the receiver of an optical line terminator. This results in a need for long packet preambles in order to satisfy the optical dynamic range requirements for optical line terminator burst-mode input signals as specified in the International Telecommunications Union (ITU) Gigabit Passive Optical Network (GPON) standard (G.984) and ITU Broadband Passive Optical Network (BPON) standard (G.983). These long preambles effectively waste upstream bandwidth of the passive optical network. No current approach utilizes either the Media Access Control (MAC) to assist the optical receiver or utilizes an amplifier to Direct Current (DC) bias the data line to obtain a solution to different incoming optical power levels. The MAC assisted approach leverages the forward looking view of the MAC in that it has specific knowledge of which ONU is scheduled to arrive upstream next and it can use that information to precondition the receiver. In theory, such a receiver could function with almost no preamble at all. The reset based approach using the DC amplifier circuit is a reactive approach that will always require some amount of preamble to train on. Typical reactive circuit topologies that seek to determine an appropriate sampling threshold after the signal has arrived at the LT receiver will always require some amount of preamble to train on.

The passive optical network media access controller has advanced knowledge of which optical network units will be transmitting in an upstream frame. Therefore what is needed is a circuit that the Passive Optical Network (PON) Media Access Controller (MAC) can utilize to assist the Burst-Mode optical Receiver (BMRX) in the task of quickly adjusting to various input power levels in order to shorten the required amount of preamble needed for training This shorter preamble will effectively lead to increased upstream bandwidth on the passive optical network. The present invention provides a system, method, and computer readable medium that allows the passive optical network media access controller to assist the burst mode receiver to reduce the time required between upstream cells and upstream preamble length, which increases effective bandwidth of the passive optical network.

SUMMARY OF THE INVENTION

Passive optical network systems such as those specified in the ITU GPON standard (G.984) and ITU BPON standard (G.983) require specialized burst-mode optical receivers having the capability to receive signals from multiple optical network units each at a different optical power level. The ability to receive signals at different optical power levels has proven to be a challenging design task for the telecommunications industry. Multiple custom silicon integrated circuits have failed to provide an adequate solution. No current approach utilizes the media access controller or utilizes an amplifier to proactively pre-bias the data line to obtain a solution to different incoming optical power levels to the burst mode optical receiver.

The optical line terminator services a number of optical network units connected in a star arrangement using optical splitters, which reside at premise of a user. The upstream data on the passive optical network going from the optical network units to the optical line terminator is time-multiplexed between the multiple optical network units. Since each optical network unit may be located at a different physical distance from the optical line terminator, the amplitude of the upstream signal, seen at the optical line terminator, varies from one optical network unit to the next. Obtaining error-free data reception is challenging when two optical network units send consecutive bursts of data that are at very different power levels.

Current burst-mode optical receiver technology cannot predict the power level of the forthcoming burst of data seen at the receiver of an optical line terminator. Therefore the receiver of the optical line terminator is required to train itself to each upstream packet in order to receive the data error free. The receiver training is performed on dummy data called preamble which is typically a repetitive sequence of 101010 bits that the receiver can use to adjust its sampling thresholds but doesn't have to correctly recover since it isn't real data. The insertion of preamble before the actual data payload in the upstream packet reduces the effective upstream bandwidth of the passive optical network. The required training time depends largely on the amplitude differential between consecutive upstream packets with the worst case being either a high amplitude packet followed by a low amplitude packet, or vice versa. Currently the systems are designed to use a fixed preamble that is long enough to accommodate the largest amplitude difference (e.g. 15 dB). This requires a relatively long preamble that can consume a significant portion of the upstream bandwidth in PONs with a large number of ONUs. This results in a requirement for long packet preambles in order to satisfy the optical dynamic range requirements for optical line terminator burst-mode input signals as specified in the ITU GPON standard (G.984). These long preambles effectively waste bandwidth on the passive optical network. This invention reduces the required preamble by proactively applying the correct DC bias to the AC coupled interface between the TIA and LIMA, BEFORE the training preamble has arrived at the receiver input. In one embodiment of the invention, the MAC knows the upstream power level of each ONU and can pre-charge the coupling cap to the correct value before the cell arrives. The second approach utilizes the MAC to speed up the charging of the coupling cap proactively. By utilizing the media access controller data to Direct Current (DC) bias the burst-mode input signals of the optical line terminator, the preamble can be shortened. This shorter preamble will effectively lead to increased upstream bandwidth on the passive optical network.

The present invention utilizes a passive optical network media access controller information of previous and subsequent upstream cell optical power to determine the charge to inject into coupling capacitors between a Trans-Impedance Amplifier (TIA) and a Limiting Amplifier (LIMA) in order to reduce the recovery time required by the optics between upstream cells. One embodiment of the present invention uses analog switches, shown in the drawings as FET transistors, with a precisely controlled pulse width from the PON MAC to inject the correct amount of charge into the AC coupling caps between the TIA and LIMA in order to provide the correct voltage across the AC coupling cap for the next upstream burst. A second embodiment of the invention utilizes a standard DAC to provide the correct voltage for the left side of the AC coupling caps, before being switched onto the caps by the FETs. The advantage the present invention provides is to realize a substantial reduction in the amount of preamble required by the burst-mode receiver to reach equalization. This translates into increased upstream bandwidth on the passive optical network.

In one embodiment of the present invention, a system for a burst mode optical receiver that enables an optical receiver to receive signals from a plurality of optical network units at different optical power levels is provided. The system may include a memory that stores a received signal strength indication, and a media access controller communicably coupled to the memory. The media access controller receives a received signal strength indication of an upcoming data stream to an optical network unit, and asserts a signal control voltage during a guard time to an optical receiver to optimize reception of incoming data streams of the optical network unit based upon the received signal strength indication received from the upcoming data stream.

In a further embodiment of the present invention, a computer readable medium comprises instructions for estimating received signal strength indication from a previous data stream to an optical network unit, linking the estimated received signal strength indication information of the optical network unit, and adjusting an optical receiver to optimize reception of subsequent incoming data streams of the optical network unit based upon received signal strength indication information received from the previous data stream. The computer readable medium may also comprise instructions for collecting received signal strength indication information of the previous data stream to the optical network unit, instructions for storing the collected received signal strength indication information and instructions for generating a lookup table of the collected received signal strength indication information of the optical network unit, wherein the estimation occurs after a predetermined interval, the estimation occurs in parallel to adjusting the optical receiver or the estimation occurs after adjusting the optical receiver. Another embodiment of the invention may have the RSSI levels provisioned by the system user during system startup instead of being measured by circuitry inside the receiver.

In yet a further embodiment, a system for a burst mode optical receiver comprises a memory, and a media access controller communicably coupled to the memory, the media access controller adapted to, estimate received signal strength indication to an optical network unit, and adjust an optical receiver by applying a first control voltage, a second control voltage and a third control voltage to optimize reception of an incoming data stream of the optical network unit based upon received signal strength indication information. The system may also comprise a first trans-impedance amplifier having an inverting output, the first trans-impedance amplifier having a non-inverting output, a first resistor connected to the first trans-impedance amplifier inverting output, a second resistor connected to the first trans-impedance amplifier non-inverting output, a first capacitor connected to the first trans-impedance amplifier inverting output, the first capacitor connected in parallel to the first resistor, a second capacitor connected to the first trans-impedance amplifier non-inverting output, the second capacitor connected in parallel to the second resistor, a third capacitor connected to the first resistor, the third capacitor having a capacitance less than the first capacitor, a fourth capacitor connected to the second resistor, the fourth capacitor having a capacitance less than the second capacitor, a first limiting amplifier having an inverting input connected to the third capacitor and a non-inverting input connected to the fourth capacitor, a first transistor having a gate receiving the first control voltage, the first transistor having a drain connected to supply voltage, the first transistor having a source connected to the first resistor, a second transistor having a gate receiving the second control voltage, the second transistor having a drain connected to the first transistor source, the second transistor having a source connected to ground, a third transistor having a gate receiving the first control voltage, the third transistor having a drain connected to supply voltage, the third transistor having a source connected to the second resistor, a fourth transistor having a gate receiving the second control voltage, the fourth transistor having a drain connected to the third transistor source, the fourth transistor having a source connected to ground, a fifth transistor having a gate receiving the third control voltage, the fifth transistor having a drain connected to supply voltage, the fifth transistor having a source connected to the first limiting amplifier non-inverting input, and a sixth transistor having a gate receiving the third control voltage, the sixth transistor having a drain connected to supply voltage, the sixth transistor having a source connected to the first limiting amplifier inverting input.

An alternative embodiment of the system, FIG. 4. may also comprise a second trans-impedance amplifier having an inverting output, the second trans-impedance amplifier having a non-inverting output, a third resistor connected to the second trans-impedance amplifier non-inverting output, a fifth capacitor connected to the third resistor, a fourth resistor connected to the second trans-impedance amplifier inverting output, a sixth capacitor connected to the fourth resistor, a second limiting amplifier having a non-inverting input connected to the fifth capacitor and an inverting input connected to the sixth capacitor, a seventh transistor having a drain connected to the second trans-impedance amplifier non-inverting output, the seventh transistor having a gate connected to a reset junction receiving the third control voltage, the seventh transistor having a source, an eighth transistor having a drain connected to the second trans-impedance amplifier inverting output, the eighth transistor having a gate connected to the reset junction, the eighth transistor having a source, a fifth resistor connected to the second limiting amplifier non-inverting input, a sixth resistor connected to the second limiting amplifier inverting input, the sixth resistor connected to the fifth resistor, a buffer amplifier having an inverting input connected to the seventh transistor source, the buffer amplifier inverting input connected to the eight transistor source, the buffer amplifier output connected to the buffer amplifier inverting input, the buffer output connected to fifth resistor, the buffer output connected to the sixth resistor, the buffer amplifier having a non-inverting input, and a seventh capacitor connected to ground, the seventh capacitor connected to the buffer amplifier non-inverting input.

In yet another embodiment of the system, FIG. 5, may comprise a second trans-impedance amplifier having an inverting output, the second trans-impedance amplifier having a non-inverting output, a third resistor connected to the second trans-impedance amplifier non-inverting output, a fifth capacitor connected to the third resistor, a fourth resistor connected to the second trans-impedance amplifier inverting output, a sixth capacitor connected to the fourth resistor, a second limiting amplifier having an inverting input connected to the fifth capacitor and a non-inverting input connected to the sixth capacitor, a seventh transistor having a drain connected to the second trans-impedance amplifier non-inverting output, the seventh transistor having a gate connected to a reset junction receiving the third control voltage, the seventh transistor having a source, an eighth transistor having a drain connected to the second trans-impedance amplifier inverting output, the eighth transistor having a gate connected to the reset junction, the eighth transistor having a source, the eighth transistor source connected to the seventh transistor source, a fifth resistor connected to the second limiting amplifier non-inverting input, a sixth resistor connected to the second limiting amplifier inverting input, the sixth resistor connected to the fifth resistor, the connection of the sixth resistor to the fifth resistor connected to the eighth transistor source, a seventh resistor connected to the connection of the fifth and sixth resistor, a buffer amplifier having an inverting input, the buffer amplifier having an output connected to the buffer amplifier inverting input, the buffer output connected to the seventh resistor, the buffer amplifier having a non-inverting input, a seventh capacitor connected to ground, the seventh capacitor connected to the buffer amplifier non-inverting input, an eighth capacitor connected to the seventh transistor source, the eighth capacitor connected to ground, and a ninth capacitor connected to the eighth transistor source, the ninth capacitor connected to ground.

In one alternative embodiment of the invention a method for enabling an optical receiver to receive signals from a plurality of optical network units at different optical power levels, comprises, collecting a received signal strength indication from an upcoming data stream of an optical network unit, and asserting a signal control voltage during a guard time to an optical receiver to optimize reception of incoming data streams of the optical network unit based upon received signal strength indication received from the upcoming data stream. The method may also comprise loading the collected received signal strength indication, converting the collected received signal strength indication to the signal control voltage and scaling the signal control voltage based upon a current signal strength indication and the received signal strength indication from the upcoming data stream, wherein the conversion is performed prior to the guard time and wherein the signal control voltage is approximately equivalent to the common-mode signal level of the upcoming data stream. The method may additionally comprise de-asserting the signal control voltage at the end of the guard time, applying a voltage pulse to de-assert the signal control voltage and storing the received signal strength indication, wherein the collecting occurs in the media access controller.

In a second alternative embodiment of the invention a computer readable medium comprises instructions for, collecting a received signal strength indication from an upcoming data stream of an optical network unit, and asserting a first signal control voltage at an initiation of a guard time to an optical receiver to optimize reception of an incoming data stream of the optical network unit based upon received signal strength indication received from the upcoming data stream, and asserting a second signal control voltage during reception of the incoming data stream. The computer readable medium may comprise instructions for de-asserting the first signal control voltage after a pre-determined interval, voltage following the first signal control voltage and de-asserting the second signal control voltage at the initiation of a subsequent guard time. The computer readable medium may additionally comprise switching a plurality of energy storage elements to form a parallel path based upon the first signal control voltage and the second signal control voltage, wherein the asserting the first signal control voltage occurs in the media access controller and the asserting the second signal control voltage occurs in the media access controller.

In a third alternative embodiment of the invention a system for burst mode optical receiver, comprises, a memory, and a media access controller communicably coupled to the memory, wherein the media access controller, receives a received signal strength indication of an upcoming data stream to an optical network unit, estimates a signal control voltage based upon a current signal strength indication and the received signal strength indication of the upcoming signal, and applies the estimated signal control voltage to an optical receiver to optimize reception of an incoming data stream of the optical network unit based upon received signal strength indication. The system may also comprise a trans-impedance amplifier having an inverting output, the trans-impedance amplifier having a non-inverting output, a first resistor connected to the first trans-impedance amplifier inverting output, a second resistor connected to the trans-impedance amplifier non-inverting output, a first capacitor connected to the trans-impedance amplifier inverting input, the first capacitor connected in parallel to the first resistor, a second capacitor connected to the trans-impedance amplifier non-inverting output, the second capacitor connected in parallel to the second resistor, a third capacitor connected to the first resistor, the third capacitor having a capacitance less than the first capacitor, a fourth capacitor connected to the second resistor, the fourth capacitor having a capacitance less than the second capacitor, a first limiting amplifier having an inverting input connected to the third capacitor and a non-inverting input connected to the fourth capacitor, a first transistor having a gate receiving the signal control voltage, the first transistor having a drain connected to supply voltage, the first transistor having a source connected to the third capacitor, a second transistor having a gate receiving the signal control voltage, the second transistor having a drain connected to the supply voltage, the second transistor having a source connected to the fourth capacitor, a voltage follower connected to the media access controller, the voltage follower having an output and an input, a third transistor having a gate receiving the signal control voltage, the third transistor having a drain connected to the second capacitor, the third transistor having a source connected to the voltage follower output, and a fourth transistor having a gate receiving the signal control voltage, the fourth transistor having a drain connected to the first capacitor, the fourth transistor having a source connected to the voltage follower output. The system may additionally comprise a digital to analog converter having an input connected to the media access controller and an output connected to the voltage follower input.

BRIEF DESCRIPTION OF THE DRAWINGS

FIG. 17 depicts a fourth software flow diagram of burst mode optical receiver in accordance with an embodiment of the present invention; and FIG. 18 depicts a seventh embodiment of the system of burst mode optical receiver in accordance with an embodiment of the present invention.

DETAILED DESCRIPTION OF THE INVENTION

Figure 1:
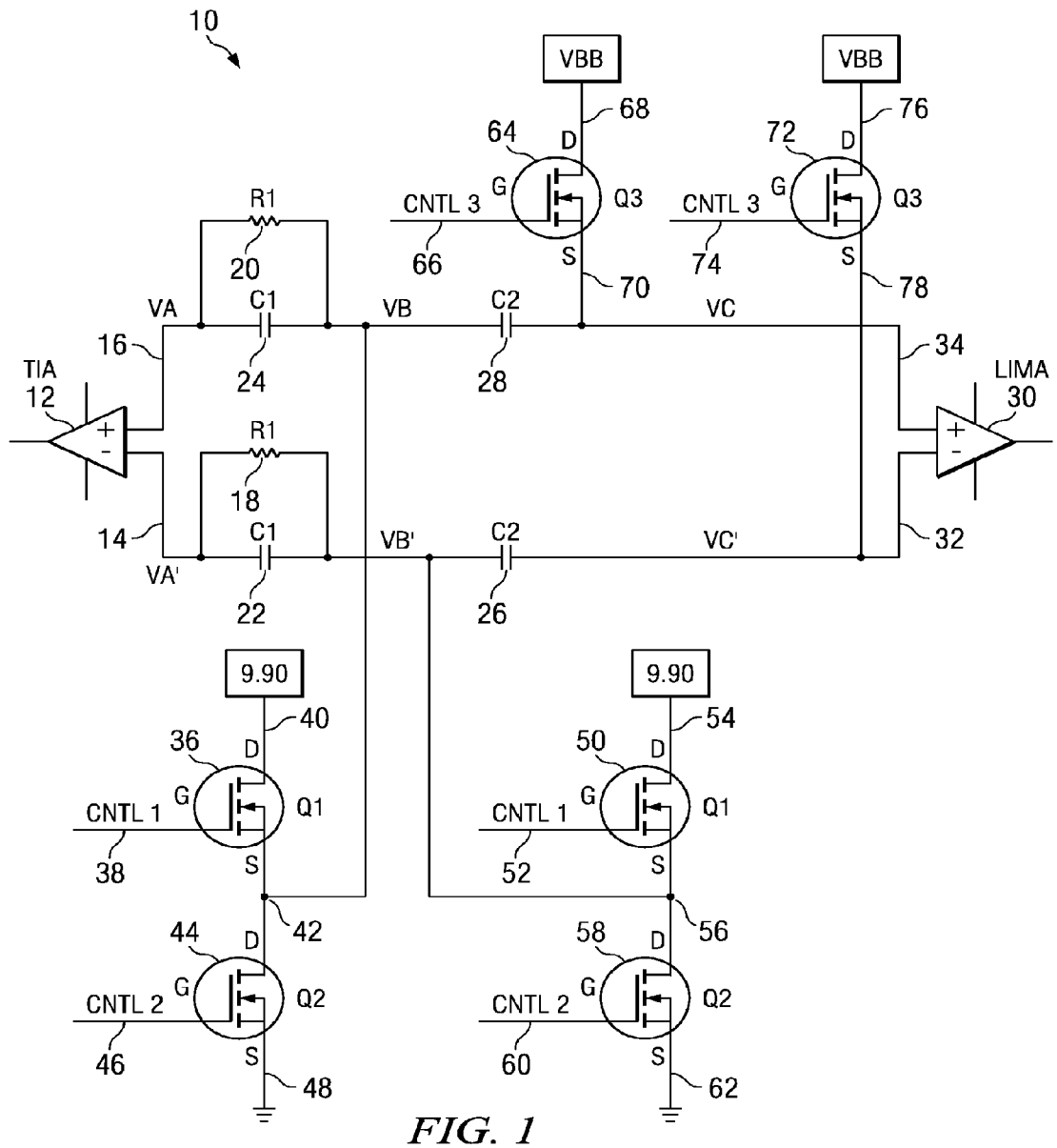
FIG. 1 depicts a first embodiment of the system of burst mode optical receiver in accordance with an embodiment of the present invention.

Referring now to FIG. 1, a first system 10 of burst mode optical receiver is depicted. The first embodiment of the invention comprises a first trans-impedance amplifier 12 has an inverting output 14 and a non-inverting output 16. A first resistor 18 is connected to the first trans-impedance amplifier inverting output and a second resistor 20 is connected to the non-inverting output. A first capacitor 22 is connected to the first trans-impedance amplifier inverting output wherein the first capacitor connected in parallel to the first resistor. A second capacitor 24 is connected to the first trans-impedance amplifier non-inverting output wherein the second capacitor is connected in parallel to the second resistor. A third capacitor is 26 is connected to the first resistor and has a capacitance less than the first capacitor. A fourth capacitor 28 is connected to the second resistor and has a capacitance less than the second capacitor. A first limiting amplifier 30 has an inverting input 32 and is connected to the third capacitor. The first limiting amplifier has a non-inverting input 34 connected to the fourth capacitor. A first transistor 36 has a gate 38 receiving the first control voltage and a drain 40 connected to supply voltage and a source 42 connected to the first resistor. A second transistor 44 has a gate 46 receiving the second control voltage, a drain connected to the first transistor source and a source 48 connected to ground. A third transistor 50 has a gate 52 receiving the first control voltage, a drain 54 connected to supply voltage and a source 56 connected to the second resistor. A fourth transistor 58 has a gate 60 receiving the second control voltage, a drain connected to the third transistor source and a source 62 connected to ground. A fifth transistor 64 has a gate 66 receiving the third control voltage, a drain 68 connected to supply voltage and a source 70 connected to the first limiting amplifier non-inverting input. A sixth transistor 72 has a gate 74 receiving the third control voltage, a drain 76 connected to supply voltage and a source 78 connected to the first limiting amplifier inverting input. These blocks or modules are software, hardware, firmware, and/or the combination of software, hardware, and/or firmware.

In one embodiment, the present invention utilizes the passive optical network media access controller's knowledge to facilitate the adjustment in Alternating Current (AC) coupling capacitor voltage to reduce the recovery time between upstream cells required by the optics. In one embodiment, the present invention does not rely on Analog to Digital (A/D) and Digital to Analog (D/A) converters to bring the information from the media access controller into the optical receiver to adjust the AC coupling capacitor voltage. In a second embodiment of the present invention a DAC based approached is utilized. The passive optical network media access controller uses its advanced knowledge of the previous and subsequent upstream cell optical powers to determine how much charge to inject into the coupling capacitors between the TIA and LIMA. The advantage the present invention provides is a substantial reduction in the amount of preamble required by the burst-mode receiver to reach equalization. This translates into increased upstream bandwidth on the passive optical network.

The left hand side of the present invention is the differential output from a Trans-Impedance Amplifier (TIA). The right hand side device is a Limiting Amplifier (LIMA) differential input. In a typical Ethernet Passive Optical Network (EPON) style optical module these two devices (TIA/LIMA) are AC coupled to each other with a single series capacitance in each leg of the differential signal (e.g. 26 and 28) similar to FIG. 3.

The TIA and the LIMA are AC coupled due to the output signal from the TIA having a common-mode voltage that is proportional to the average optical power seen by the photodiode at the TIA input. The LIMA requires its input to be biased to a constant common-mode voltage (VBB). Therefore, the voltage V R-C that exists between points R and C assumes a different value that depends on the average optical power received.

Presently, Ethernet Passive Optical Network (EPON) design requires large amounts of preamble so that AC capacitors have time to charge or discharge to the appropriate value. One of the reasons this takes a relatively long time is because the biasing circuit at the input of the LIMA is high impedance in order to avoid unwanted attenuation that will degrade receiver sensitivity. However, the high input impedance of the LIMA reduces the amount of current that can be drawn from the output of the TIA. It is this TIA output current that is required to charge the coupling capacitors to the final value and a smaller current translates into a longer time for the capacitors to stabilize. During this stabilization time the signal at the LIMA input is not centered on VBB and the LIMA produces extreme duty cycle distortion which will prevent clock recovery devices from activating until the duty cycle distortion subsides. Large amounts of preamble required corresponding to 20% wasted upstream bandwidth.

The present invention utilizes the PON MAC to receive Received Signal Strength Indication (RSSI) information to adjust the coupling capacitor on the optical receiver before the data stream arrives.

During the guard time 62 (also see reference numeral 84 in FIG. 2), between upstream packets, the passive optical network media access controller will assert CNTL3 to the Q5 and Q6 transistors. This will hold node C at VBB through low impedance. Then the media access controller will apply a variable width pulse to either CNTL1, or to CNTL2. CNTL1 is used to raise the voltage on the coupling capacitors, while CNTL2 is used to lower the voltage on the coupling capacitors. The width of the pulse controls the amount of charge injected or removed from node B. In this manner, voltage V B-C can be quickly adjusted to any desired value between 3.3V and ground. After a brief time, all CNTL signals are de-asserted; the adjustment circuit is then high impedance relative to the original signal path so as not to degrade the receiver's sensitivity during normal operation. Since C1>>C3 the majority of the AC coupling voltage appears across capacitor C3 (V B'-C') and is fully adjustable by the media access controller. The voltage on capacitor C1 is therefore zero or very close to zero. The resistor R1 is used to keep capacitor C1 bled down (discharged). In an alternate embodiment the resistor R1 is replaced with a Field Effect Transistor (FET). In some embodiments, the dual capacitor approach encompassing C1 and C3 can be eliminated and instead, a single capacitor can be used.

The circuit is characterized in advance to develop a look up table for the media access controller. If the previous packet is at power level X and the next packet is at power level Y, then the lookup table will show whether to drive CNTL1 or CNTL2, and how long to drive it. The end result is that before the guard time is over, the coupling capacitors will already be at the correct common-mode voltage so that when the preamble starts, the signal at the input of the LIMA will already be centered about VBB which will prevent duty cycle distortion of the LIMA's data output.

Figure 2:
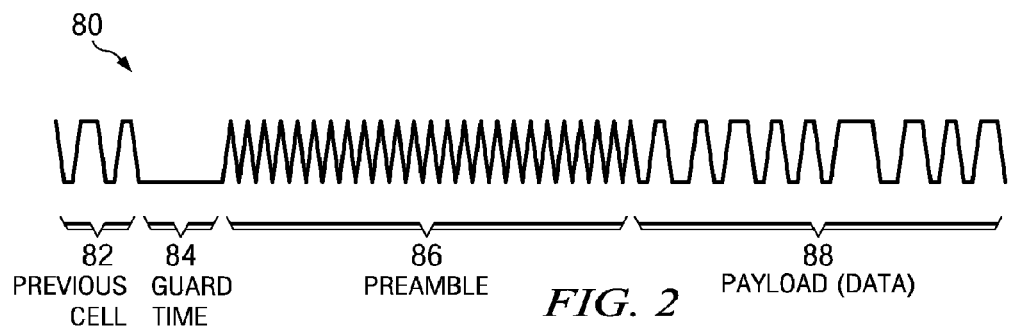
FIG. 2 depicts overhead protocol in accordance with ITU G.984 GPON Standards.

Referring now to FIG. 2 the overhead protocol 80 is shown. The protocol contains a previous cell data stream 82, followed by guard time 84, after which a preamble 86 precedes the payload data 88 of the subsequent data stream.

Figure 3:
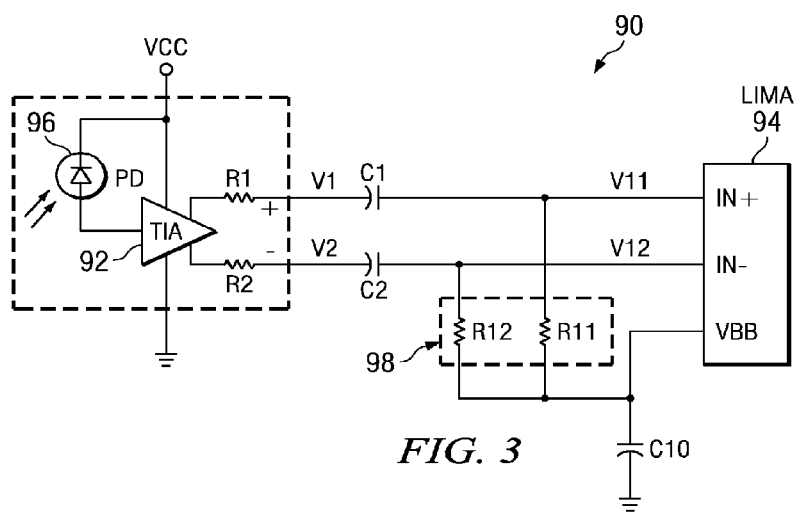
FIG. 3 depicts a system of burst mode optical receiver with AC coupling without reset.

Referring now to FIG. 3, a typical prior art system of burst mode optical receiver with AC coupling without reset is shown 90. The system has a trans-impedance amplifier 92, communicating with an optical receiver 96. The trans-impedance amplifier is connected to the limiting amplifier 94, which relies on bleed down resistors 98 to set the bias. The capacitors C1 & C2 together with R11 & R12 form an RC circuit. If a discharge time could be shortened, many bytes of preamble could be saved during the transition. This can be established by using a reset circuit to hasten the charge equalization.

Figure 4:
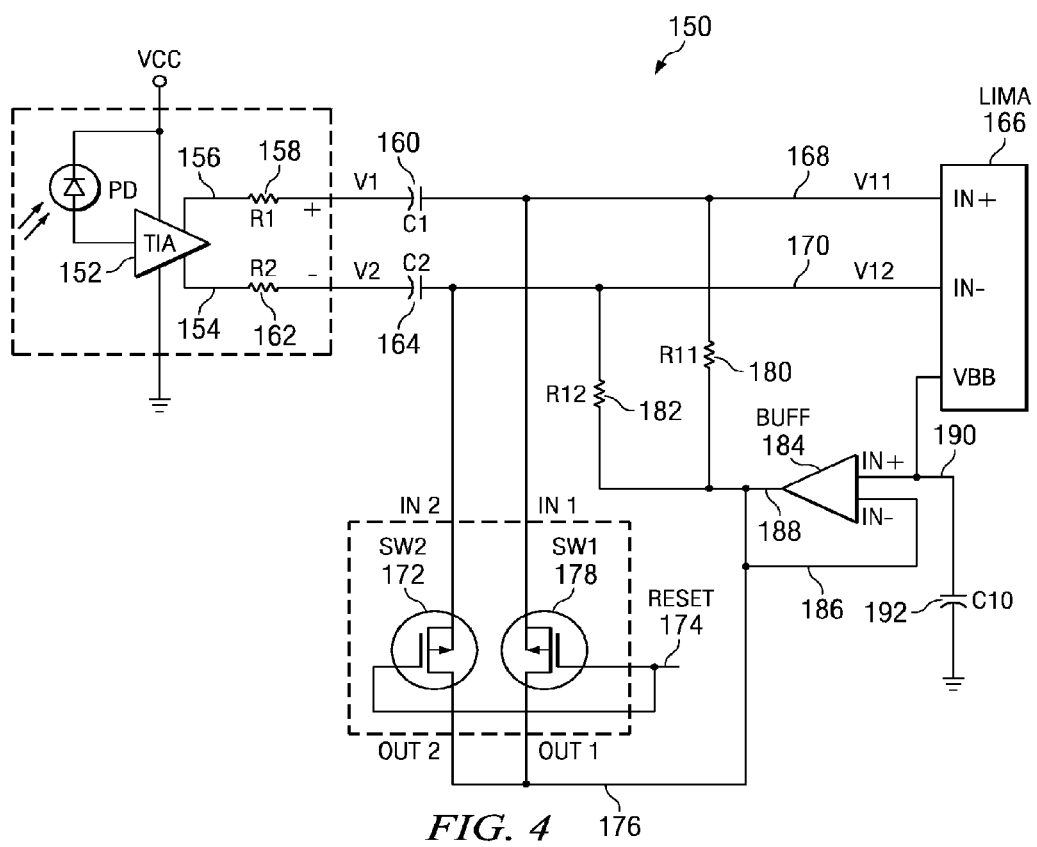
FIG. 4 depicts a second embodiment of the system of burst mode optical receiver in accordance with an embodiment of the present invention.

Referring now to FIG. 4, a second system 150 of burst mode optical receiver is depicted. FIG. 4 is a reactive circuit that does not use the PON MAC to assist in training As such, the present invention describes both reactive and proactive circuit topologies. The second embodiment of the invention comprises a second trans-impedance amplifier 152 which has an inverting output 154 and a non-inverting output 156. A third resistor 158 is connected to the second trans-impedance amplifier non-inverting output. A fifth capacitor 160 is connected to the third resistor. A fourth resistor 162 is connected to the second trans-impedance amplifier inverting output. A sixth capacitor 164 is connected to the fourth resistor. A second limiting amplifier 166 has a non-inverting input 168 connected to the fifth capacitor and an inverting input 170 connected to the sixth capacitor. A seventh transistor 172 has a drain connected to the second trans-impedance amplifier non-inverting output and a gate 174 connected to a reset junction receiving the third control voltage. The seventh transistor has a source 176. An eighth transistor 178 has a drain connected to the second trans-impedance amplifier inverting output and a gate connected to the reset junction. The eighth transistor has a source. A fifth resistor 180 is connected to the second limiting amplifier non-inverting input. A sixth resistor 182 is connected to the second limiting amplifier inverting input. The sixth resistor is connected to the fifth resistor. A buffer amplifier 184 has an inverting input 186 connected to the seventh transistor source and an output 188 connected to the buffer amplifier inverting input. The buffer output is connected to the fifth and sixth resistor. The buffer amplifier has a non-inverting input 190. A seventh capacitor 192 is connected to ground; the seventh capacitor is connected to the buffer amplifier non-inverting input.

The coupling capacitor is discharged so that the quiescent voltage across the cap will depend on the input optical power level, which is the ideal bias point for the Limiting Amplifier (LIMA) input. The VBB is generated in the LIMA, but has limited drive capability. We propose to inset a buffer amplifier which has a high impedance input and a low impedance output that tracks the input voltage without loading the VBB output of the LIMA. The low output impedance of the buffer amplifier (less than 10 ohms) will discharge the 100 pF capacitor in about 1 ns; that is 500 times faster than without the reset circuit.

Figure 5:
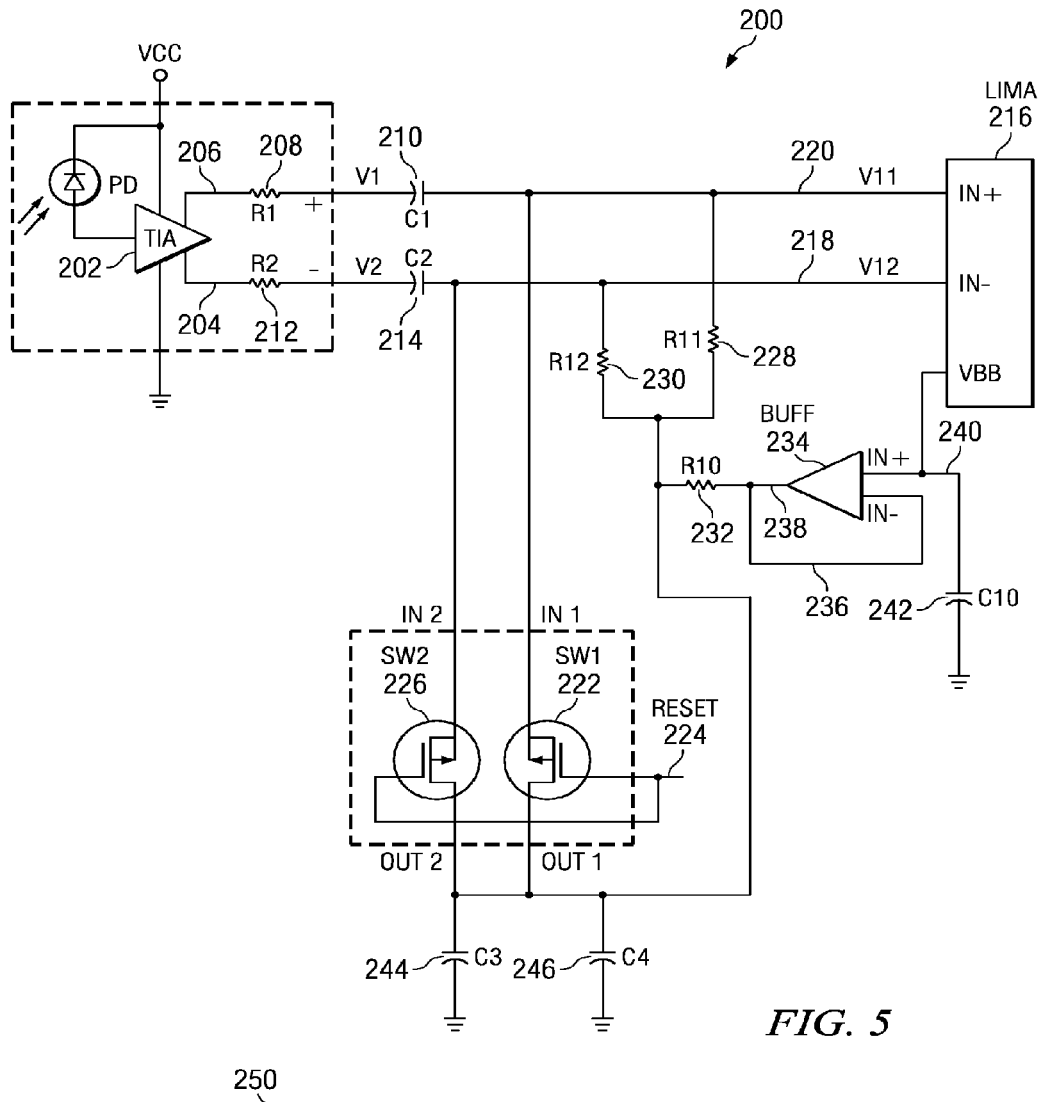
FIG. 5 depicts a third embodiment of the system of burst mode optical receiver in accordance with an embodiment of the present invention.

Referring now to FIG. 5, a third system 200 of burst mode optical receiver is depicted. In the third embodiment of the invention a second trans-impedance amplifier 202 has an inverting output 204 and a non-inverting output 206. A third resistor 208 is connected to the second trans-impedance amplifier non-inverting output. A fifth capacitor 210 is connected to the third resistor. A fourth resistor 212 is connected to the second trans-impedance amplifier inverting output. A sixth capacitor 214 is connected to the fourth resistor. A second limiting amplifier 216 has an inverting input 218 connected to the sixth capacitor and a non-inverting input 220 connected to the fifth capacitor. A seventh transistor 222 has a drain connected to the second trans-impedance amplifier non-inverting output and a gate connected to a reset junction 224 receiving the third control voltage. The seventh transistor has a source. An eighth transistor 226 has a drain connected to the second trans-impedance amplifier inverting output and a gate connected to the reset junction. The eighth transistor has a source connected to the seventh transistor source. A fifth resistor 228 is connected to the second limiting amplifier non-inverting input. A sixth resistor 230 is connected to the second limiting amplifier inverting input. The sixth resistor is connected to the fifth resistor. The junction of the sixth resistor to the fifth resistor is connected to the eighth transistor source. A seventh resistor 232 is connected to the connection of the fifth and sixth resistor. A buffer amplifier 234 has an inverting input 236 and an output 238 connected to the buffer amplifier inverting input and to the seventh resistor. The buffer amplifier has a non-inverting input 240. A seventh capacitor 242 is connected to ground and to the buffer amplifier non-inverting input. An eighth capacitor 244 is connected to the seventh transistor source and to ground. A ninth capacitor 246 is connected to the eighth transistor source and to ground.

The present invention applies a reset signal for a short time typically 10 to 20 ns. The coupling capacitors will be charged or discharged such that at the end of the reset pulse the data is fully acceptable. The existing solution will need various lengths of time to end the transition: The larger the level differences between cells, the longer it takes to get acceptable data. With this new method of charging, or discharging, of the capacitors on the AC coupled lines the preamble can be substantially shortened leading to greater bandwidth on the passive optical network.

The reset pulse will discharge the previous cell level during the guard time. When the new cell arrives and starts the preamble, only a few bits are required to charge the capacitors to the required level. The speed of charging depends on the switches ON resistance and the TIA output impedance, but is generally very short.

Figure 6:
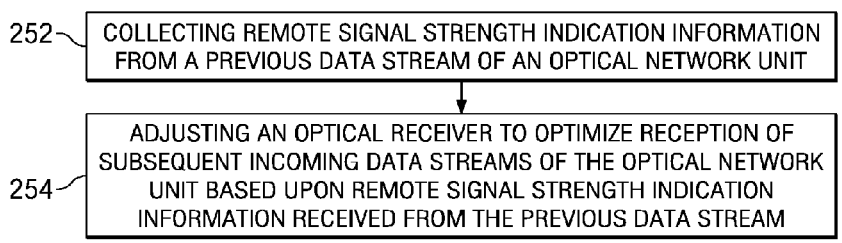
FIG. 6 depicts a first method flow diagram of burst mode optical receiver in accordance with an embodiment of the present invention.

Referring now to FIG. 6, a first flow diagram of the method 250 of passive optical network media access controller assisted clock recovery is depicted. The method enables an optical receiver to receive signals from a plurality of optical network units at different optical power levels comprising, collecting 252 received signal strength indication information from a previous data stream of an optical network unit, and adjusting 254 an optical receiver to optimize reception of subsequent incoming data streams of the optical network unit based upon received signal strength indication information received from the previous data stream. The method may be implemented by software, hardware, firmware, and/or the combination of software, hardware, and/or firmware.

Figure 7:
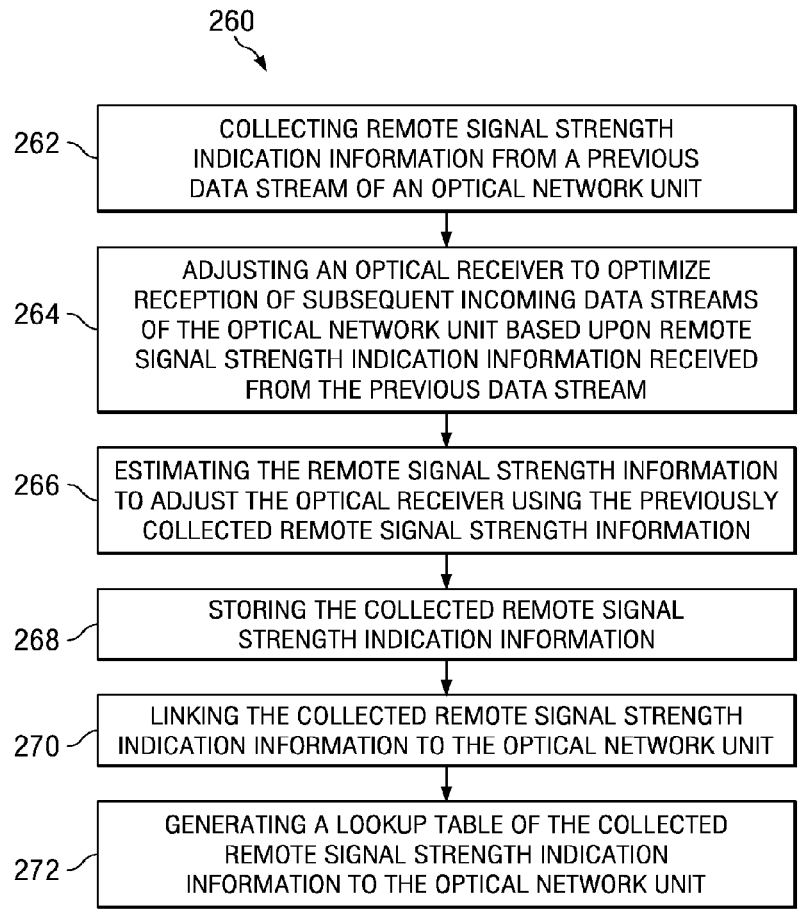
FIG. 7 depicts a second method flow diagram of burst mode optical receiver in accordance with an embodiment of the present invention.

Referring now to FIG. 7, a second flow diagram of the method 260 of passive optical network media access controller assisted clock recovery is depicted. The method enables an optical receiver to receive signals from a plurality of optical network units at different optical power levels comprising, collecting 262 received signal strength indication information from a previous data stream of an optical network unit, and adjusting 264 an optical receiver to optimize reception of subsequent incoming data streams of the optical network unit based upon received signal strength indication information received from the previous data stream. The method also comprises estimating 266 the received signal strength indication to adjust the optical receiver using the previously collected the received signal strength indication, storing 268 the collected received signal strength indication information, linking 270 the collected received signal strength indication information of the optical network unit and generating 272 a lookup table of the collected received signal strength indication information of the optical network unit. The method may be implemented by software, hardware, firmware, and/or the combination of software, hardware, and/or firmware.

Figure 8:
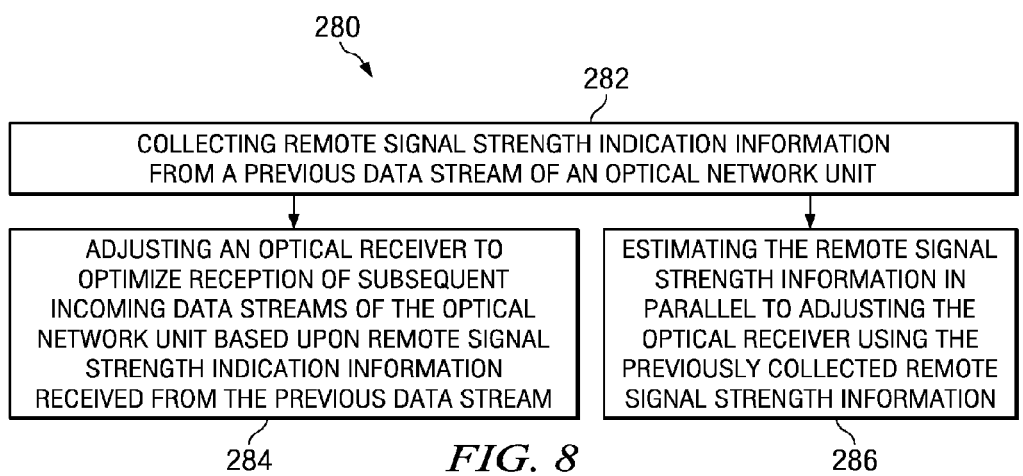
FIG. 8 depicts a third method flow diagram of burst mode optical receiver in accordance with an embodiment of the present invention.

Referring now to FIG. 8, a third flow diagram of the method 280 of passive optical network media access controller assisted clock recovery is depicted. The method enables an optical receiver to receive signals from a plurality of optical network units at different optical power levels comprising, collecting 282 received signal strength indication information from a previous data stream of an optical network unit, adjusting 284 an optical receiver to optimize reception of subsequent incoming data streams of the optical network unit based upon received signal strength indication information received from the previous data stream and estimating 286 the received signal strength indication in parallel to adjusting the optical receiver using the previously collected the received signal strength indication. The method may be implemented by software, hardware, firmware, and/or the combination of software, hardware, and/or firmware.

Figure 9:
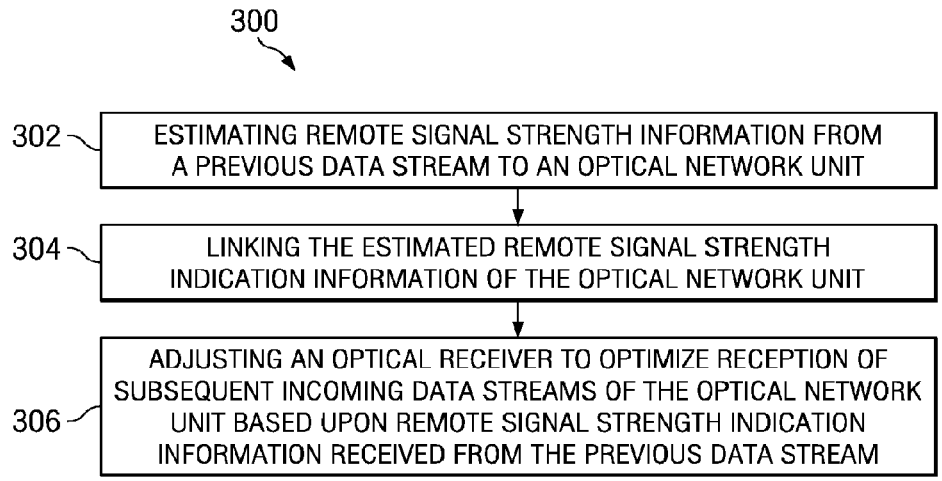
FIG. 9 depicts a first software flow diagram of burst mode optical receiver in accordance with an embodiment of the present invention.

Referring now to FIG. 9, a first software flow diagram of the method 300 of passive optical network media access controller assisted clock recovery is depicted. The computer readable medium comprising instructions for, estimating 302 received signal strength indication from a previous data stream to an optical network unit, linking 304 the estimated received signal strength indication information of the optical network unit, and adjusting 306 an optical receiver to optimize reception of subsequent incoming data streams of the optical network unit based upon received signal strength indication information received from the previous data stream. These steps are performed by software but may also be performed by hardware, firmware, and/or the combination of software, hardware, and/or firmware without departing from the scope of the present invention.

It is important to note that for the FET based approach, the PON MAC should know the ONU1 and ONU2 upstream optical power levels (RSSI) that is used to calculate the pulse width to be applied to the FETs. A very bright cell followed by a very dim upstream cell will require a longer pulse. Upstream bursts that are very close in power level may require no pulse at all, or a very short one. With the DAC based approach, the PON MAC should consider the ONU2 power level. The DAC will develop the appropriate voltage to receive the ONU2 power level and will apply it to the cap.

Figure 10:
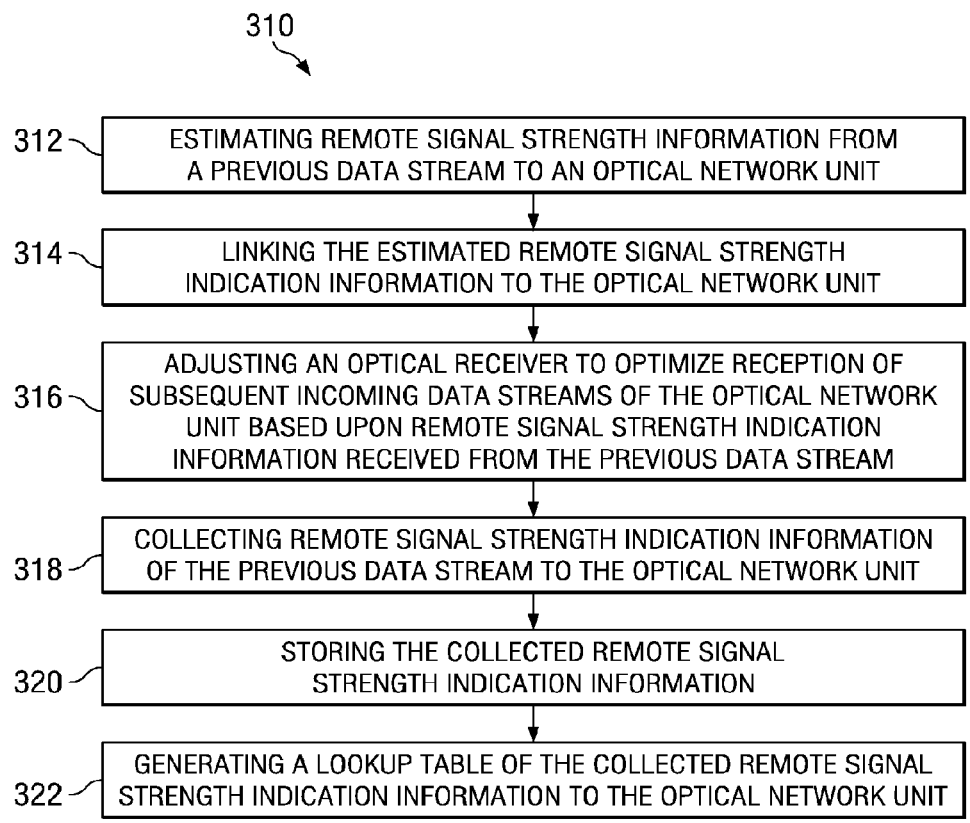
FIG. 10 depicts a second software flow diagram of burst mode optical receiver in accordance with an embodiment of the present invention.

Referring now to FIG. 10, a second software flow diagram of the method 310 of passive optical network media access controller assisted clock recovery is depicted. The computer readable medium comprising instructions for, estimating 312 received signal strength indication from a previous data stream to an optical network unit, linking 314 the estimated received signal strength indication information of the optical network unit, adjusting 316 an optical receiver to optimize reception of subsequent incoming data streams of the optical network unit based upon received signal strength indication information received from the previous data stream. The computer readable medium also comprises instructions for collecting 318 received signal strength indication information of the previous data stream to the optical network unit, for storing 320 the collected received signal strength indication information and for generating 322 a lookup table of the collected received signal strength indication information of the optical network unit. These steps are performed by software but may also be performed by hardware, firmware, and/or the combination of software, hardware, and/or firmware without departing from the scope of the present invention.

Figure 11:
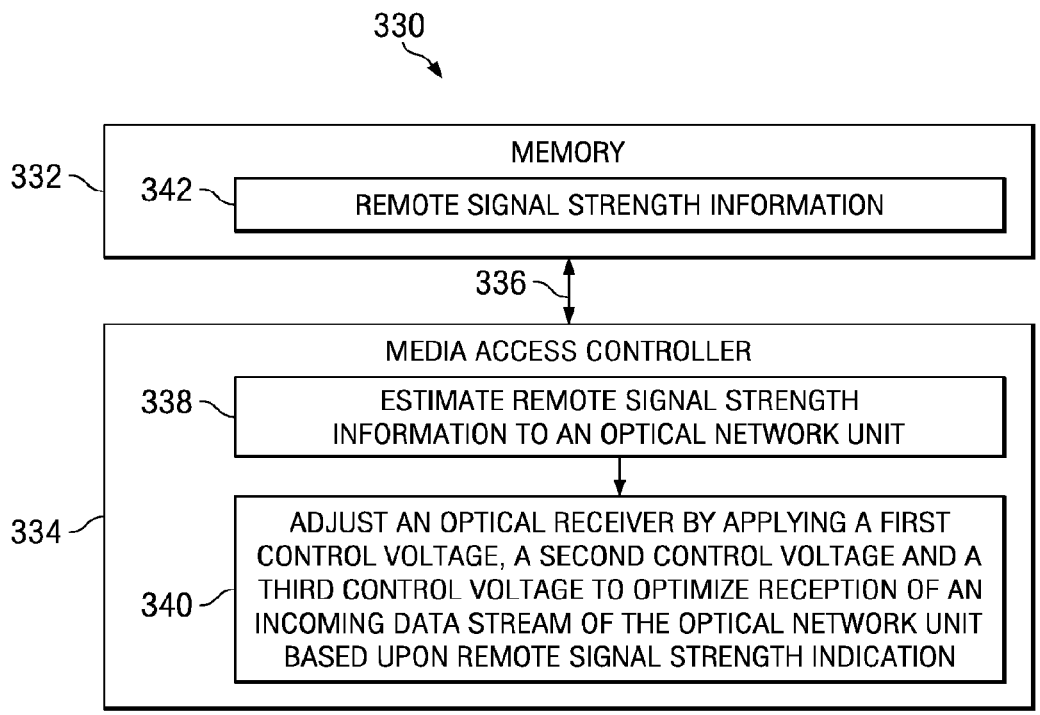
FIG. 11 depicts a fourth embodiment of the system of burst mode optical receiver in accordance with an embodiment of the present invention.

Referring now to FIG. 11, a fourth system 330 of burst mode optical receiver is depicted. The fourth embodiment of the invention comprises, a memory 332, and a media access controller 334 communicably coupled 336 to the memory, the media access controller adapted to, estimate 338 received signal strength indication 342 to an optical network unit, and adjust 340 an optical receiver by applying a first control voltage, a second control voltage and a third control voltage to optimize reception of an incoming data stream of the optical network unit based upon received signal strength indication information.

Alternate Embodiments

Figure 12:
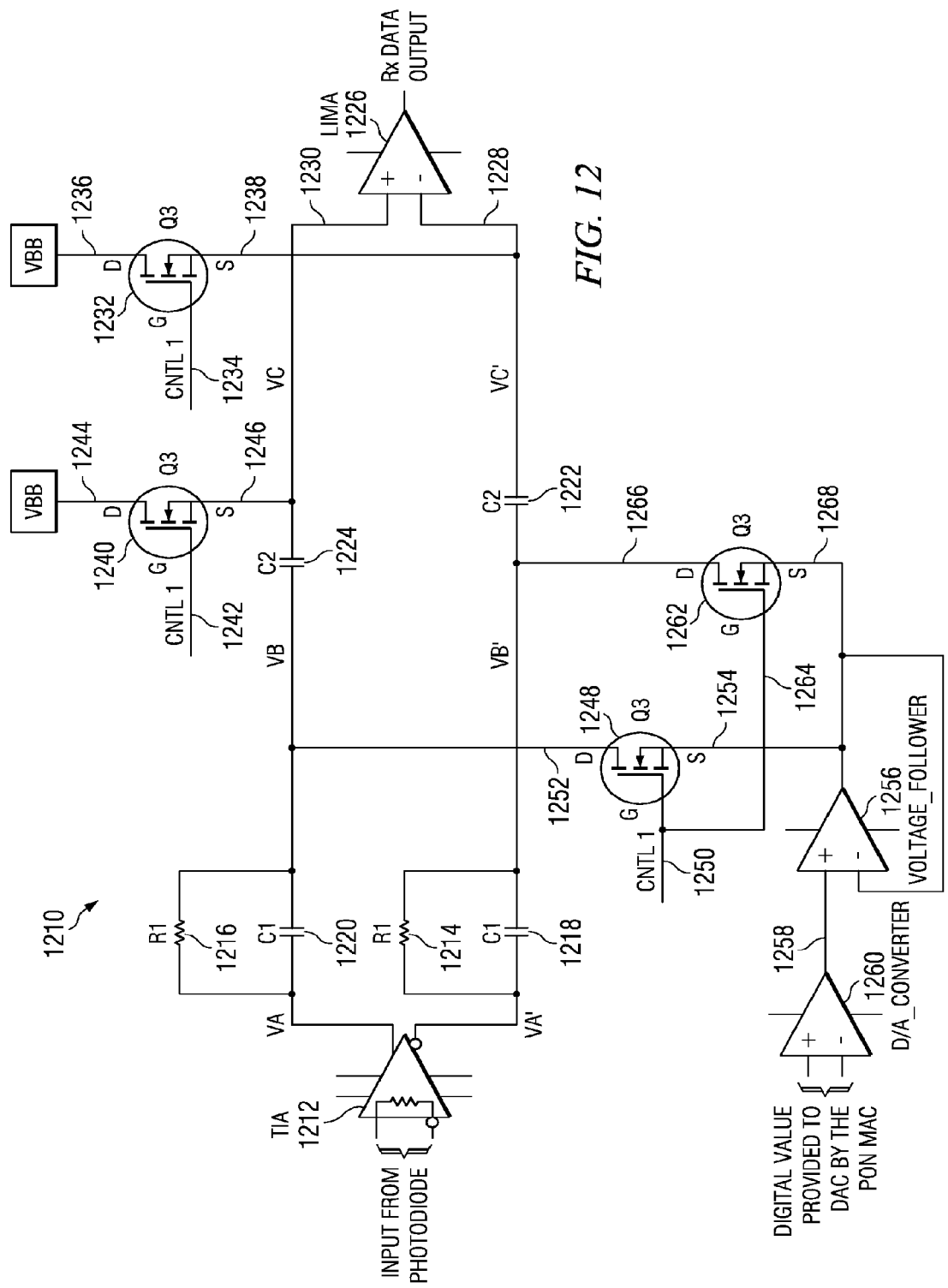
FIG. 12 depicts a fifth embodiment of the system of burst mode optical receiver in accordance with an embodiment of the present invention.

Referring now to FIG. 12, a fifth system 1210 of a burst mode optical receiver is depicted. The fifth embodiment of the invention comprises a first trans-impedance amplifier 1212 that has an input from a photodiode across the first trans-impedance amplifier inputs. A first resistor 1214 is connected to the first trans-impedance amplifier inverting output and a second resistor 1216 is connected to a non-inverting output. A first capacitor 1218 is connected to the first trans-impedance amplifier inverting output wherein the first capacitor is connected in parallel to the first resistor. A second capacitor 1220 is connected to the first trans-impedance amplifier non-inverting output wherein the second capacitor is connected in parallel to the second resistor. A third capacitor is 1222 is connected to the first resistor and has a capacitance less than the first capacitor. A fourth capacitor 1224 is connected to the second resistor and has a capacitance less than the second capacitor. A first limiting amplifier 1226 has an inverting input 1228 and is connected to the third capacitor. The first limiting amplifier has a non-inverting input 1230 connected to the fourth capacitor. A first transistor 1232 has a gate 1234 receiving the first control voltage and a drain 1236 connected to supply voltage and a source 1238 connected to the limiting amplifier inverting input. A second transistor 1240 has a gate 1242 receiving the first control voltage, a drain 1244 connected to the first transistor source and a source 1246 connected to the limiting amplifier non-inverting input. A third transistor 1248 has a gate 1250 receiving the first control voltage, a drain 1252 connected to the second resistor and a source 1254 connected to the output of a voltage follower 1256 which has its non-inverting input 1258 connected to the output of a digital to analog converter 1260. A fourth transistor 1262 has a gate 1264 receiving the first control voltage, a drain 1266 is connected to the first resistor and a source 1268 connected to the output of the voltage follower.

The fifth system circuit operates in a manner similar to the previous embodiments but has a key advantage. In this embodiment the PON MAC does not require a two-dimensional look up table as the first circuit did, knowing the power level it is currently operating at, and the power level of the next cell. In this case, the MAC need only know the power level of the next cell, which will get scaled by a mathematical function to determine the required DAC voltage to apply across the coupling cap C2. While the previous cell is still being received, the MAC will load the appropriate digital value for the next upcoming cell into the DAC. When the previous cell is finished and the guard time between cells has started, the signal control 1 is asserted. This holds one side of C2 at Vbb, which is required for the limiting amplifier. Meanwhile, the other side of the coupling cap C2 is driven to the DAC voltage.

The DAC voltage is chosen to be the same as the common-mode signal level that will be present when the output of the TIA goes active when the cell arrives. In embodiments that use a FET instead of R1, a brief pulse will be applied at this time to discharge C1. Since C1>>C2, 99%+ of the offset voltage between the TIAs common-mode voltage and the LIMAs required input common-mode voltage (Vbb) appears across C2, leaving the voltage across C1 approximately zero. When the guard time ends and the cell preamble arrive at the TIA output, control signal 1 is de-asserted. After a brief transient settling time, the circuit will provide undistorted RX data. Since the PON MAC knows the upcoming cell's power level, it knows what voltage needs to exist on C2. It doesn't wait for the TIA to drive C2 to the proper voltage level as in a typical prior art EPON style receiver. It instead uses this circuit to pre-charge C2 to the correct level during the guard time, so that when the cell arrives C2 is already correctly charged and ready for undistorted reception. Distortion comes primarily from the signal at the LIMA input not being centered on Vbb.

Figure 13:
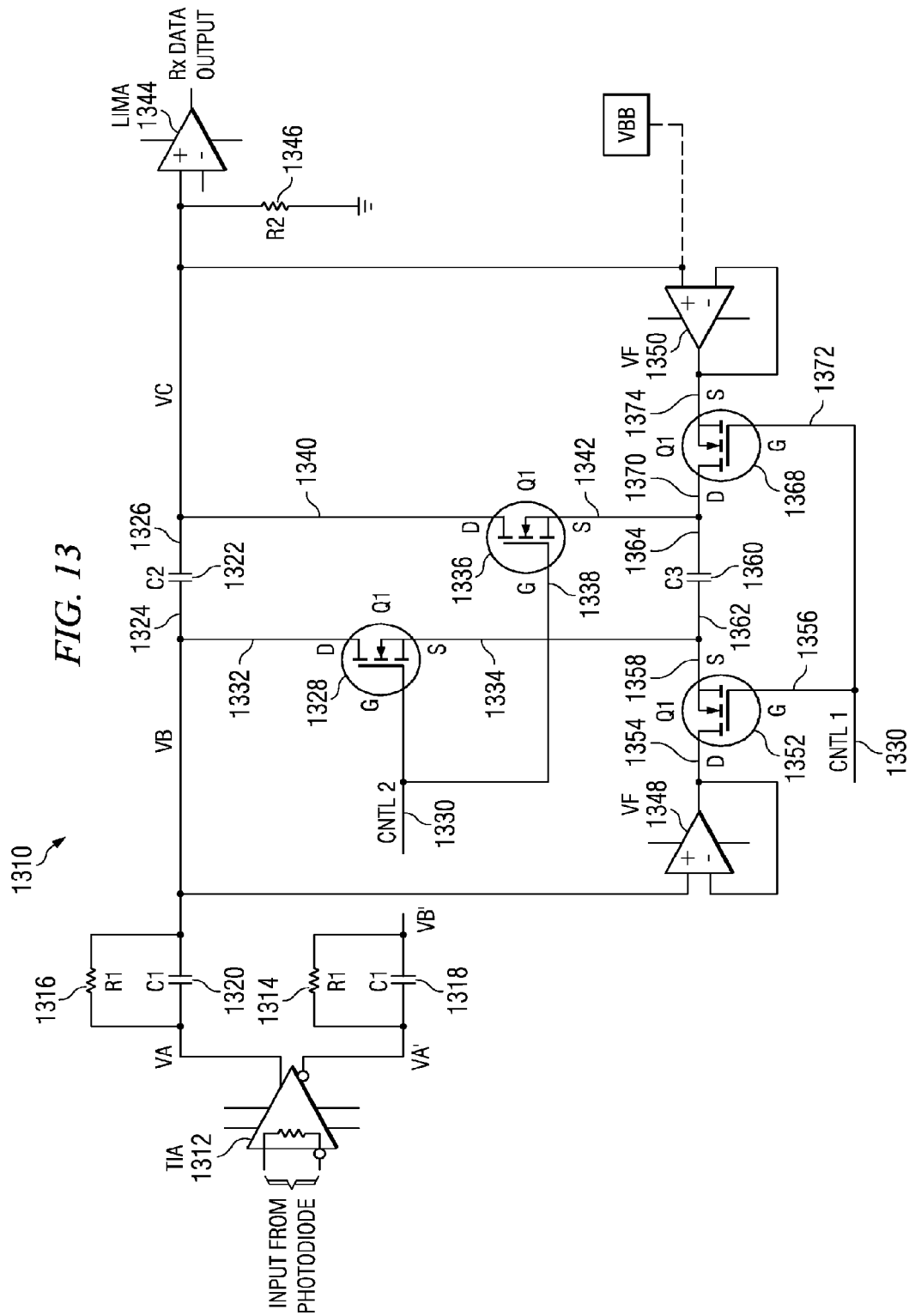
FIG. 13 depicts a sixth embodiment of the system of burst mode optical receiver in accordance with an embodiment of the present invention.

Referring now to FIG. 13, a sixth system 1310 of burst mode optical receiver is depicted. The sixth embodiment of the invention comprises a first trans-impedance amplifier 1312 has an input from a photodiode across the first trans-impedance amplifier inputs. A first resistor 1314 is connected to the first trans-impedance amplifier inverting output and a second resistor 1316 is connected to the non-inverting output. A first capacitor 1318 is connected to the first trans-impedance amplifier inverting output wherein the first capacitor connected in parallel to the first resistor. A second capacitor 1320 is connected to the first trans-impedance amplifier non-inverting output wherein the second capacitor is connected in parallel to the second resistor. A third capacitor is 1322, has a first lead 1324 and a second lead 1326. The third capacitor first lead is connected to the second resistor and has a capacitance less than the first capacitor. In this figure half of the circuit is shown connected to the first trans-impedance amplifier non-inverting side, the other half of the circuit mirrors what is shown and is connected to the trans-impedance amplifier inverting output. A first transistor 1328 has a gate 1330 receiving a second control voltage and a drain 1332 connected to the third capacitor first lead and a source 1334. A second transistor 1336 has a gate 1338 receiving the second control voltage, a drain 1340 connected to the third capacitor second lead and a source 1342. A limiting amplifier 1344 is connected to the third capacitor second lead. A resistor 1346 is connected to the limiting amplifier. A first voltage follower 1348 is connected to the third capacitor first lead. A second voltage follower 1350 is connected to the third capacitor second lead. A third transistor 1352 has a drain 1354 connected to the output of the first voltage follower, a gate 1356 connected to a first control voltage and a source 1358 connected to the first transistor source. The third transistor gate is connected to a fourth capacitor 1360 first lead 1362. A fourth transistor 1368 has a drain 1370 connected to the second transistor source and the fourth capacitor second lead. The fourth transistor gate 1372 is connected to the first control voltage. The fourth transistor source 1374 is connected to the second voltage follower output.

The sixth system circuit alters the receivers AC coupling time constant. Initially both control signals are off and the transistors are not conducting at this point. At the start of guard time control 1 is asserted. When the guard time passes and the preamble begins, C2 and R2 are selected to have a time constant such that C2 quickly assumes the correct offset voltage between the TIA and LIMA. The voltage followers drive C3 to the same voltage as C2. Still during the preamble, once C2 is sufficiently close to it's final value, as an example 2 or 3 time constants, control 1 is de-asserted followed by the assertion of control 2. At this point C2 and C3 are in parallel and at the same voltage. The time constant is now (C2+C3) R2, which is considerably longer and is chose such that the receiver can provide the required 72 bit CID, consecutive digit immunity. The system must tolerate 72 1's or 0's in a row without allowing the common-mode voltage at the LIMA input to drift too far away from Vbb causing distortion. Control 2 remains asserted during the entire cell reception and is de-asserted when the guard time begins. This embodiment utilizes a small capacitor, C2, to first acquire the correct offset voltage between the TIA and LIMA. Once this voltage is known, it's driven across a larger capacitor, C3, using voltage followers. Then C3 is switched so it's in parallel with C2 in order to give a long time constant necessary to meet the CID requirements of the system.

Figure 14:
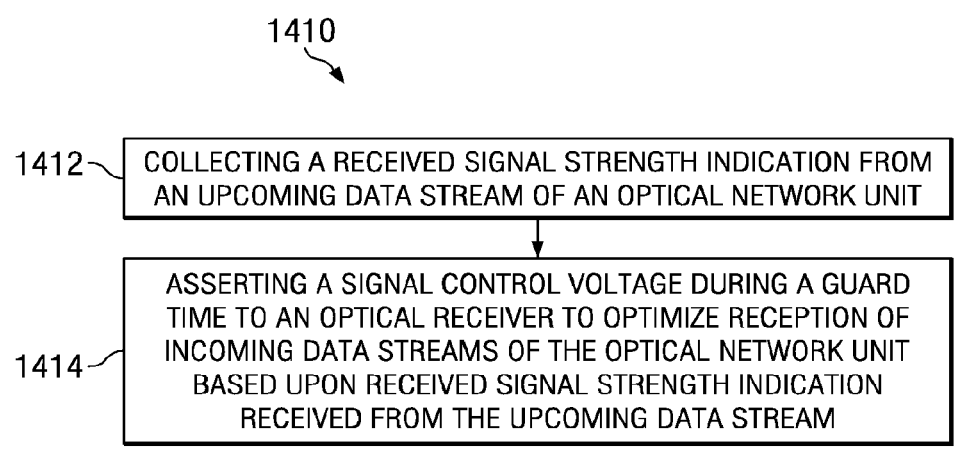
FIG. 14 depicts a fourth method flow diagram of burst mode optical receiver in accordance with an embodiment of the present invention.

Referring now to FIG. 14, a fourth method 1410 of burst mode optical reception is depicted and comprises a number of blocks or modules that are software, hardware, or firmware, and/or the combination of software, hardware, and/or firmware. The fourth method enables an optical receiver to receive signals from a plurality of optical network units at different optical power levels, comprises, collecting 1412 a received signal strength indication from an upcoming data stream of an optical network unit, and asserting 1414 a signal control voltage during a guard time to an optical receiver to optimize reception of incoming data streams of the optical network unit based upon received signal strength indication received from the upcoming data stream. The transfer of information occurs via at least one of: a wireless protocol, a wired protocol and a combination of the wireless protocol and the wired protocol.

Figure 15:
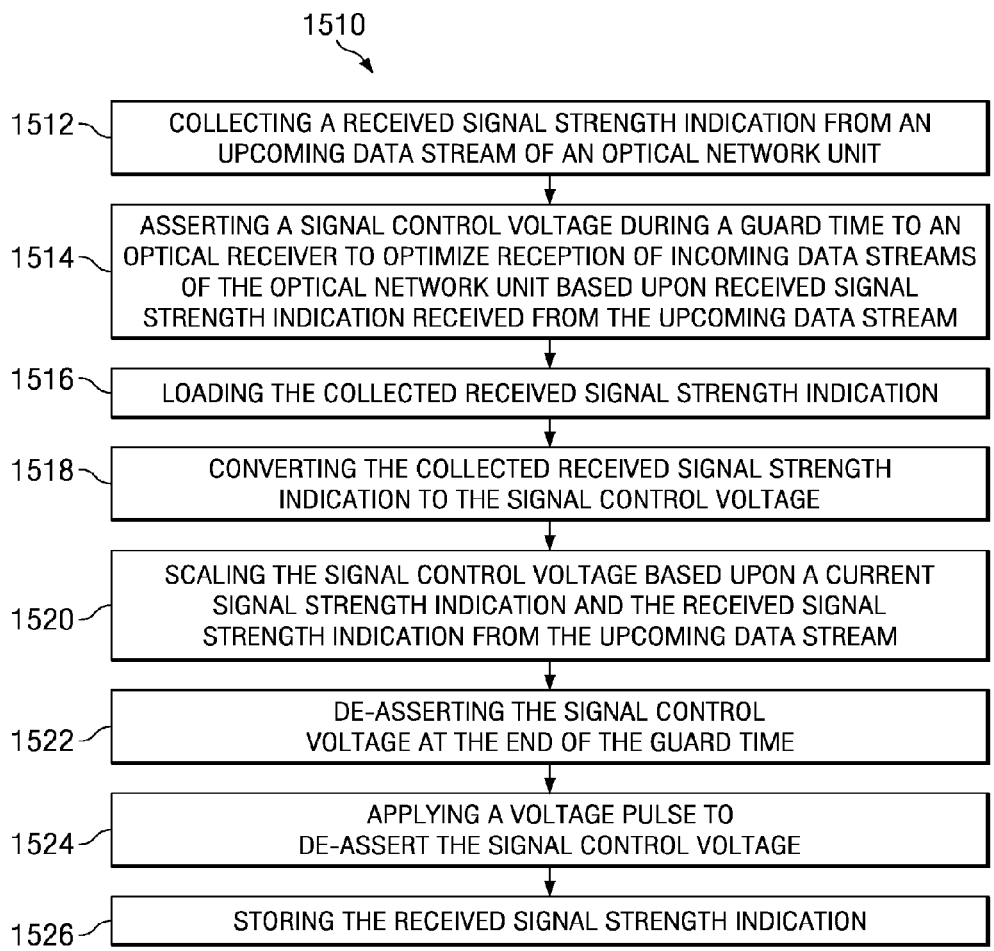
FIG. 15 depicts a fifth method flow diagram of burst mode optical receiver in accordance with an embodiment of the present invention.

Referring now to FIG. 15, a fifth method 1510 of burst mode optical reception is depicted and comprises a number of blocks or modules that are software, hardware, or firmware, and/or the combination of software, hardware, and/or firmware. The fifth method enables an optical receiver to receive signals from a plurality of optical network units at different optical power levels, comprises, collecting 1512 a received signal strength indication from an upcoming data stream of an optical network unit, and asserting 1514 a signal control voltage during a guard time to an optical receiver to optimize reception of incoming data streams of the optical network unit based upon received signal strength indication received from the upcoming data stream. The method may also comprise loading 1516 the collected received signal strength indication, converting 1518 the collected received signal strength indication to the signal control voltage and scaling 1520 the signal control voltage based upon a current signal strength indication and the received signal strength indication from the upcoming data stream, wherein the conversion is performed prior to the guard time and wherein the signal control voltage is approximately equivalent to the common-mode signal level of the upcoming data stream. The method may additionally comprise de-asserting 1522 the signal control voltage at the end of the guard time, applying 1524 a voltage pulse to de-assert the signal control voltage and storing 1526 the received signal strength indication, wherein the collecting occurs in the media access controller. The transfer of information occurs via at least one of: a wireless protocol, a wired protocol and a combination of the wireless protocol and the wired protocol.

Figure 16:
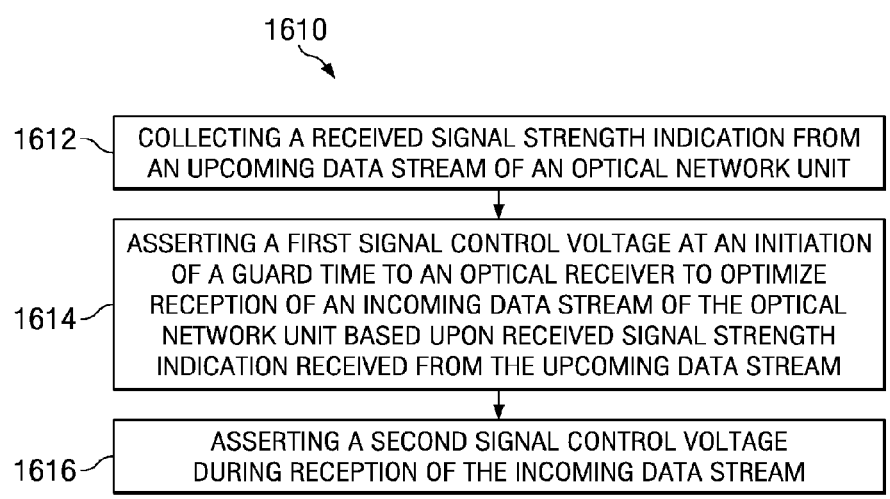
FIG. 16 depicts a third software flow diagram of burst mode optical receiver in accordance with an embodiment of the present invention.

Referring now to FIG. 16, a third software flow diagram 1610 of burst mode optical reception is depicted. The third computer readable medium comprises instructions for, collecting 1612 a received signal strength indication from an upcoming data stream of an optical network unit, asserting 1614 a first signal control voltage at an initiation of a guard time to an optical receiver to optimize reception of an incoming data stream of the optical network unit based upon received signal strength indication received from the upcoming data stream, and asserting 1616 a second signal control voltage during reception of the incoming data stream. These steps are preferably embodied in a computer readable medium or software but may also be embodied in firmware and are utilized via hardware. The transfer of information occurs via at least one of a wireless protocol, a wired protocol and the combination of the wireless protocol and the wired protocol. The steps performed in this figure are performed by software, hardware, firmware, and/or the combination of software, hardware, and/or firmware.

Referring now to FIG. 17, a fourth software flow diagram 1710 of burst mode optical reception is depicted. The fourth computer readable medium comprises instructions for, collecting 1712 a received signal strength indication from an upcoming data stream of an optical network unit, asserting 1714 a first signal control voltage at an initiation of a guard time to an optical receiver to optimize reception of an incoming data stream of the optical network unit based upon received signal strength indication received from the upcoming data stream, and asserting 1716 a second signal control voltage during reception of the incoming data stream. The computer readable medium may comprise instructions for de-asserting 1718 the first signal control voltage after a predetermined interval, voltage following 1720 the first signal control voltage and de-asserting 1722 the second signal control voltage at the initiation of a subsequent guard time. The computer readable medium may additionally comprise switching 1724 a plurality of energy storage elements to form a parallel path based upon the first signal control voltage and the second signal control voltage, wherein the asserting the first signal control voltage occurs in the media access controller and the asserting the second signal control voltage occurs in the media access controller. These steps are preferably embodied in a computer readable medium or software but may also be embodied in firmware and are utilized via hardware. The transfer of information occurs via at least one of a wireless protocol, a wired protocol and the combination of the wireless protocol and the wired protocol. The steps performed in this figure are performed by software, hardware, firmware, and/or the combination of software, hardware, and/or firmware.

Referring now to FIG. 18, a seventh embodiment 1810 of the system of burst mode optical receiver is depicted. The seventh system for burst mode optical receiver, comprises, a memory 1812 that stores a received signal strength indication 1814, and a media access controller 1816 communicably coupled 1818 to the memory, wherein the media access controller, receives 1820 a received signal strength indication of an upcoming data stream to an optical network unit, estimates 1822 a signal control voltage based upon a current signal strength indication and the received signal strength indication of the upcoming signal, and applies 1824 the estimated signal control voltage to an optical receiver to optimize reception of an incoming data stream of the optical network unit based upon received signal strength indication. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the ONT's, OLT's or media access controllers. Also, these capabilities may be performed in the current manner or in a distributed manner and on, or via, any device able to provide and/or receive broadband signals. Further, although depicted in a particular manner, various modules or blocks may be repositioned without departing from the scope of the current invention. For example, the functionality performed by the media access controller can be self-contained. Still further, although depicted in a particular manner, a greater or lesser number ONT's, OLT's or media access controllers can be utilized with the present invention in order to accomplish the present invention, to provide additional known features to the present invention, and/or to make the present invention more efficient. Also, for example, the MAC to memory communication may be accessed by a cellular phone, a computer with external wireless capability (such as a wireless card) or internal wireless capability (such as 802.11 or any of the other 802 variants), by an Internet Protocol enabled phone, or by any device able to send and/or receive information. The communication described herein occurs via at least one of a wireless protocol, a wired protocol and/or a combination of a wireless protocol and a wired protocol. The blocks or modules described herein are software, hardware, firmware, and/or the combination of software, hardware, and/or firmware.

What is claimed is:

1. A system for burst mode optical receiver, comprising:
a memory that stores a received signal strength indication; and
a media access controller communicably coupled to the memory, wherein media access controller:
receives a received signal strength indication of an upcoming data stream to an optical network unit; and
asserts a signal control voltage during a guard time to an optical receiver to optimize reception of incoming data streams of the optical network unit based upon the received signal strength indication received from the upcoming data stream.

2. The system of claim 1, wherein the media access controller is further structured to:
estimate the signal control voltage based upon a current signal strength indication and the received signal strength indication of the data stream; and
apply the estimated signal control voltage to the optical receiver to optimize the reception of the incoming data streams of the optical network unit based upon the received signal strength indication.

3. The system of claim 1, further comprising:
a trans-impedance amplifier having an inverting output, the trans-impedance amplifier having a non-inverting output;
a first resistor connected to the first trans-impedance amplifier inverting output;
a second resistor connected to the trans-impedance amplifier non-inverting output;
a first capacitor connected to the trans-impedance amplifier inverting input, the first capacitor connected in parallel to the first resistor;
a second capacitor connected to the trans-impedance amplifier non-inverting output, the second capacitor connected in parallel to the second resistor;
a third capacitor connected to the first resistor, the third capacitor having a capacitance less than the first capacitor;
a fourth capacitor connected to the second resistor, the fourth capacitor having a capacitance less than the second capacitor;
a first limiting amplifier having an inverting input connected to the third capacitor and a non-inverting input connected to the fourth capacitor; and
a voltage follower connected to the media access controller, the voltage follower having an output and an input.

4. The system of claim 3, further comprising:
a first transistor having a gate receiving the signal control voltage, the first transistor having a drain connected to supply voltage, the first transistor having a source connected to the third capacitor;
a second transistor having a gate receiving the signal control voltage, the second transistor having a drain connected to the supply voltage, the second transistor having a source connected to the fourth capacitor;
a third transistor having a gate receiving the signal control voltage, the third transistor having a drain connected to the second capacitor, the third transistor having a source connected to the voltage follower output;
a fourth transistor having a gate receiving the signal control voltage, the fourth transistor having a drain connected to the first capacitor, the fourth transistor having a source connected to the voltage follower output; and
a digital to analog converter having an input connected to the media access controller and an output connected to the voltage follower input.

5. The system of claim 1, wherein the media access controller is further structured to load the collected received signal strength indication.

6. The system of claim 1, wherein the media access controller is further structured to convert the collected received signal strength indication to the signal control voltage.

7. The system of claim 6, wherein the conversion is performed prior to the guard time.

8. The system of claim 1, wherein the media access controller is further structured to scale the signal control voltage based upon a current signal strength indication and the received signal strength indication from the upcoming data stream.

9. The system of claim 1 wherein the signal control voltage is approximately equivalent to the common-mode signal level of the upcoming data stream.

10. The system of claim 1, wherein the media access controller is further structured to de-assert the signal control voltage at the end of the guard time.

11. The system of claim 10, wherein the media access controller is further structured to apply a voltage pulse to de-assert the signal control voltage.

12. The system of claim 1, wherein the media access controller is further structured to store the received signal strength indication.

13. The system of claim 1, wherein the media access controller is further structured to collect the received signal strength indication from the upcoming data stream.

14. A computer readable medium comprising instructions capable of being executed by a computer, the computer readable medium comprising instructions for:
receiving a signal strength indication of an upcoming data stream to an optical network unit; and
asserting a signal control voltage during a guard time to an optical receiver to optimize reception of incoming data streams of the optical network unit based upon the received signal strength indication received from the upcoming data stream.

15. The computer readable medium of claim 14, wherein the computer readable medium further comprises instructions to:
estimate the signal control voltage based upon a current signal strength indication and the received signal strength indication of the data stream; and
apply the estimated signal control voltage to the optical receiver to optimize the reception of the incoming data streams of the optical network unit based upon the received signal strength indication.

16. The computer readable medium of claim 14, further comprising instructions for de-asserting the first signal control voltage after a pre-determined interval.

17. The computer readable medium of claim 14, further comprising instructions for collecting the received signal strength indication.

18. The computer readable medium of claim 17, further comprising instructions for converting the collected received signal strength indication to the signal control voltage.

19. The computer readable medium of claim 18, wherein the conversion is performed prior to the guard time.

20. The computer readable medium of claim 14, further comprising instructions for scaling the signal control voltage based upon a current signal strength indication and the received signal strength indication from the upcoming data stream.

* * * * *